US010826714B2

(12) United States Patent
Kelly et al.

(10) Patent No.: US 10,826,714 B2
(45) Date of Patent: Nov. 3, 2020

(54) SMART POWER ADAPTER

(71) Applicants: Christopher T Kelly, Marion, IA (US);
Philip E. Kelly, Cedar Rapids, IA (US)

(72) Inventors: Christopher T Kelly, Marion, IA (US);
Philip E. Kelly, Cedar Rapids, IA (US)

(*) Notice: Subject to any disclaimer, the term of this patent is extended or adjusted under 35 U.S.C. 154(b) by 0 days.

(21) Appl. No.: 16/900,995

(22) Filed: Jun. 15, 2020

(65) Prior Publication Data

US 2020/0313913 A1    Oct. 1, 2020

(51) Int. Cl.
| | |
|---|---|
| *H04L 12/10* | (2006.01) |
| *H02J 13/00* | (2006.01) |
| *H04B 1/40* | (2015.01) |
| *H04W 4/14* | (2009.01) |
| *H04Q 1/45* | (2006.01) |
| *H04L 12/24* | (2006.01) |
| *H04M 3/493* | (2006.01) |
| *H04W 88/02* | (2009.01) |

(52) U.S. Cl.
CPC ........ *H04L 12/10* (2013.01); *H02J 13/00022* (2020.01); *H04B 1/40* (2013.01); *H04L 41/0654* (2013.01); *H04L 41/0686* (2013.01); *H04M 3/493* (2013.01); *H04Q 1/45* (2013.01); *H04W 4/14* (2013.01); *H04Q 2213/13405* (2013.01); *H04W 88/02* (2013.01)

(58) Field of Classification Search
CPC . H04L 12/10; H04L 41/0686; H04L 41/0654; H02J 13/00022; H04M 3/493; H04Q 1/45; H04Q 2213/13405; H04B 1/40; H04W 4/14; H04W 88/02
See application file for complete search history.

(56) References Cited

U.S. PATENT DOCUMENTS

| | | | | |
|---|---|---|---|---|
| 9,350,188 B2* | 5/2016 | Hasebe | ............ | G03G 15/5004 |
| 10,355,484 B2* | 7/2019 | Youn | ............ | H02J 7/02 |
| 2006/0111058 A1* | 5/2006 | Grant | ............ | H04M 11/007 455/127.1 |
| 2008/0100140 A1* | 5/2008 | Sorenson | ............ | H02J 13/0062 307/40 |
| 2009/0098754 A1* | 4/2009 | Li | ............ | H01R 13/7038 439/93 |
| 2011/0164471 A1* | 7/2011 | Baarman | ............ | H02J 7/0042 368/10 |
| 2013/0069617 A1* | 3/2013 | Lee | ............ | H01R 31/065 323/318 |

(Continued)

*Primary Examiner* — Vineeta S Panwalkar
(74) *Attorney, Agent, or Firm* — Barry Choobin; Patent 360

(57) ABSTRACT

The present invention is directed to device and method for monitoring power input to a networked device The device includes a housing; an optional power converter configured for AC to DC, AC to AC or DC to DC conversion; a controller enclosed in the housing and configured to send one or more notifications and receive one or more instructions from a remote server; a relay operably coupled to the controller; a first circuit electrically connecting the power converter to power mains; a second circuit electrically connecting the power converter to the relay; and a third circuit electrically connecting the relay to the networked device, wherein the controller is configured to determine alternating current status on the first circuit and a direct current status on the second circuit or the third circuit.

20 Claims, 4 Drawing Sheets

(56) References Cited

U.S. PATENT DOCUMENTS

| | | | | |
|---|---|---|---|---|
| 2014/0312691 A1* | 10/2014 | Doljack | ............. | H02J 2207/40 |
| | | | | 307/29 |
| 2016/0334769 A1* | 11/2016 | Buzzard | ................. | H02J 9/066 |
| 2017/0293335 A1* | 10/2017 | Dunstan | .............. | G06F 13/4282 |
| 2018/0006492 A1* | 1/2018 | Kim | ....................... | G06Q 50/06 |
| 2019/0245712 A1* | 8/2019 | Yu | ...................... | H04L 12/4625 |

* cited by examiner

SMART POWER ADAPTER

FIELD OF INVENTION

The present invention relates generally to a power monitoring and controlling device, which is defined in this document as a smart power adapter or SPA for short, and method for detecting a power source outage, and in particular, the present invention relates to a device for detecting an outage of power source to a networked electronic device and notifying the outage. In addition, this device can receive commands from a remote server and execute the commands.

BACKGROUND

When an electronic device is connected to a network, it is often monitored by an individual or an entity. In this document, this entity is defined as a network operation center (NOC). Monitored devices are deployed in remote locations where the NOC personnel do not have physical access to the devices. From time to time, these devices "go dark", that is, they become inaccessible via the network to which they are connected. The device can "go dark" due to many reasons, but the most common reason is a power outage causing the electronic device to shut Off. Other reasons could be that the electronic device turns to a standby mode and not communicating with the NOC. Still, other reasons could be that the electronic device freezes or hangs and may need a reboot to be functional again.

In such conditions, when the electronic device is not communicating with the NOC, a technician is usually dispatched to the location of the electronic device for troubleshooting. However, sending a technician can be labor-intensive, costly, and time-consuming. In particular, when the electronic device is located in a remote location, the cost and time for troubleshooting the electronic device can be significant. In case, when rebooting the electronic device can remedy the outage, sending a technician could be an unproductive use of resources. Such a process can often cost $100 or more for manned locations and cost can increase to $1000 or more for unmanned locations. In the case of extremely remote locations, the downtime and technician dispatch costs can be astronomical.

Thus, a need is appreciated for a device that can save the cost and time of troubleshooting and/or of sending a technician to troubleshoot an unresponsive electronic device in a network only to determine that there is a power outage or that the electronic device has to be power cycled for becoming functional again.

The phrases "networked device", "connected device", "client device", and "electronic device" are interchangeably used hereinafter and refers to an electronic device that is connected to the SPA Device of the present invention for monitoring the power input of the electronic device.

SUMMARY OF THE INVENTION

The principal objective of the present invention is therefore directed to a device that can detect an outage of power input to an electronic device.

It is a further objective of the present invention that the device can receive commands from a remote server for regulating the power input of the electronic device.

It is an additional objective of the present invention that the device can detect any fault in the power input.

It is still an additional objective of the present invention that the device can send notifications of the power outage.

It is yet an additional objective of the present invention that the notification about the electronic device not working.

It is another objective of the present invention that the device can send notification about the electronic device not being functional.

It is still another objective of the present invention that the device allows turning the electronic device On and Off from a remote location.

It is yet another objective of the present invention that the device is economical to manufacture.

It is a further objective of the present invention that the device can be integrated into a power supply of the electronic device.

It is still a further objective of the present invention that the device can reboot the electronic device.

It is yet another objective of the present invention that the device can be remotely controlled.

It is another objective of the present invention that the device can send alerts when voltage, amperage, or frequency of the input power or output power is out of acceptable limits.

In one aspect, the present invention is directed to a SPA Device for monitoring power input of a networked device, the SPA Device includes a housing; a power converter configured for AC to DC conversion; a controller enclosed in the housing, the controller configured to send one or more notifications and receive one or more instructions; a relay operably coupled to the controller; a first circuit electrically connecting the power converter to power mains; a second circuit electrically connecting the power converter to the relay; and a third circuit electrically connecting the relay to a networked device, wherein the controller is configured to determine alternating current status on the first circuit and a direct current status on the second circuit or the third circuit. In one case, the networked device can be a client device in the network or any electronic device that requires a cold restart. In one case, the power converter can be enclosed in the housing. In one case, an external power converter can be used with the present invention.

In one aspect, the relay is configured to switch between a first position and a second position, in first position current can flow from the second circuit to the third circuit, in the second position the current does not flow from the second circuit to the third circuit. The controller can be operationally coupled to the relay for switching the relay between the first position and the second position. The controller can cut off the supplied power to the connected electronic device in case the alternating current is having fluctuations including spikes. The controller can also remotely receive a command from a remote server for turning the networked device On, Off, or a power cycle (an Off to On sequence)

In one aspect, the alternating current status can include amperage, line-voltage dropouts, brownouts, spikes, and other phenomena. Also, the controller can detect any power outage. These events can be notified by the controller to a remote server, such as a network operations center (NOC). The SPA Device can also notify the NOC when the power is restored.

In one aspect, the controller can determine direct current status through a sensor coupled to second or third circuitry. The direct current status can include the amperage of current drawn by the networked device. From the amperage, the status of the networked device can be determined. For example, in case the amperage is zero, i.e. the networked device is not drawing any power can indicate that the networked device is not functional. A low amperage can indicate that the networked device is in standby mode.

In one aspect, the controller can be configured with a modem circuitry for connecting to a cellular or landline telephone network, the modem circuitry can be a transceiver that can both send and receive data. If a cellular network is used, the SPA can be configured to use a SIM (subscriber identity module) or an eSIM (electronic subscriber identity module). Alerts and commands can then be sent via text messages, also known as simple message service or SMS. Additionally, a Dual Tone Multiple Frequency (DTMF) circuitry can also be configured in the controller for communication through DTMF with a telephone connection using the public switched telephone network (PSTN). In one case, the SPA Device according to the present invention can be compliant with out-of-band management (OOBM) standard so that the SPA Device can be used for monitoring and remote control of power input when a primary network connection is lost.

In one aspect, the present invention is directed to a method of monitoring power input to a networked device, the method comprising providing a SPA Device, the SPA Device comprises a housing, a power converter configured for AC to DC conversion, a controller enclosed in the housing and configured to send one or more notifications and receive one or more commands, a relay operably coupled to the controller, a first circuit electrically connecting the power converter to the power mains; a second circuit electrically connect the power converter to the relay, and a third circuit electrically connect the relay to a client device, wherein the controller is configured to determine alternating current status on the first circuit and a direct current status on the second circuit or the third circuit. The method further comprises transmitting, by the SPA Device, to a remote server, one or more notifications based on the alternating current status and the direct current status. The notification can include power outage or fault in the device including the fault in power converter. The notification can also be based on amperage of current drawn by the networked device, such as the networked device is not functional, is in standby mode or has other power anomalies. The method further comprises receiving commands from the remote server to power Off, power On, or power cycle the networked device.

In one aspect the SPA Device can incorporate the features of IoT (internet of things) technology.

These and other objects and advantages of the embodiments herein will become readily apparent from the following detailed description.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as devices and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and devices are shown in block diagram form in order to facilitate describing the subject innovation. Moreover, the drawings may not be to scale.

The present invention is directed to a SPA Device for monitoring power input of an electronic device, detecting any outage or fault in the power input, and notifying the outage or fault to a remote server. Moreover, the SPA Device can turn the connected electronic device On and Off. Now referring to FIG. 1 which is a circuit diagram of the SPA Device 100. The SPA Device comprises a housing enclosing the components of the device. The housing can be constructed from any of a variety of materials, such as plastic or polymeric materials, steel, aluminum, or other well-known materials. The housing may be configured in several shapes or dimensions as appropriate or desirable for the purposes of the present invention.

Figure 1:
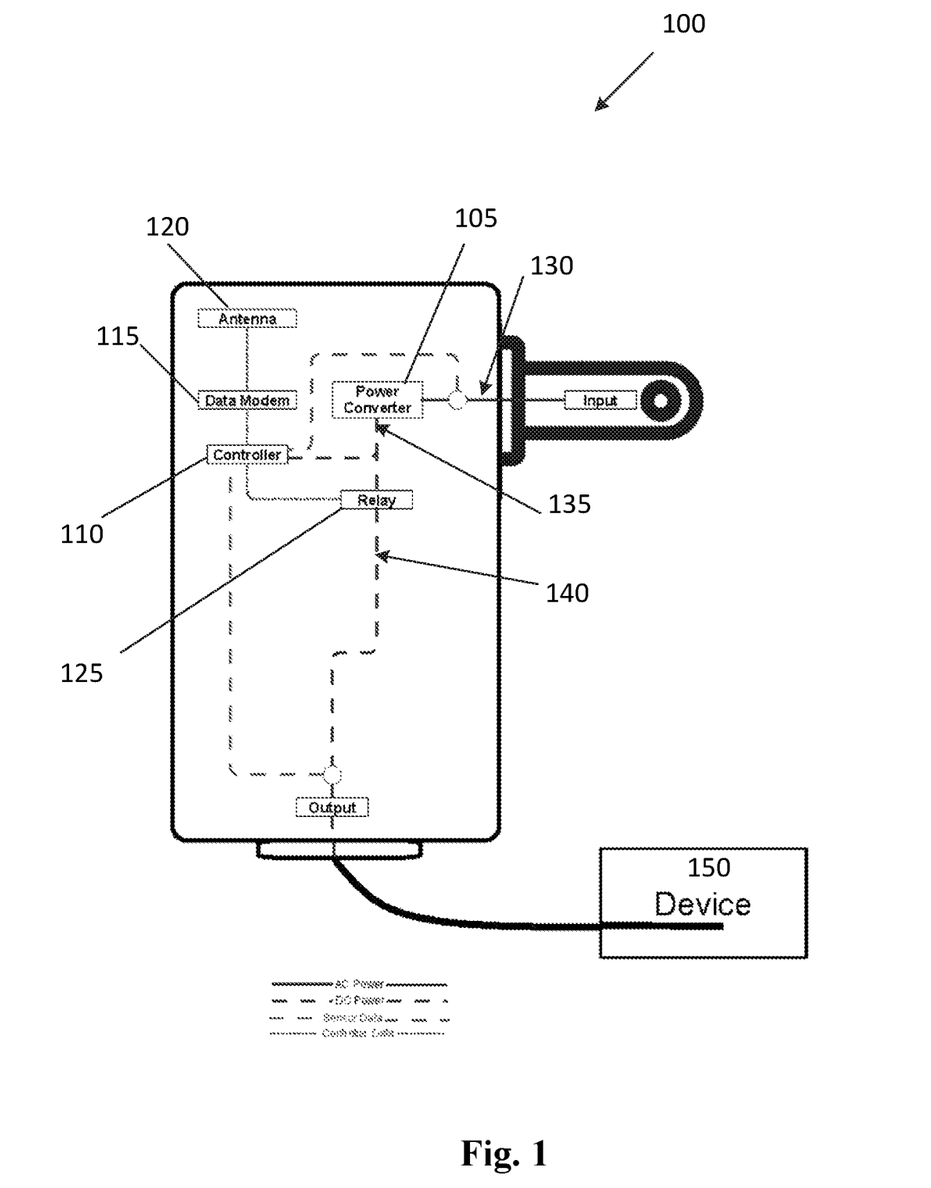
FIG. 1 is a circuit diagram of the SPA Device, according to an embodiment of the present invention.

The SPA Device 100 includes a power converter 105 which can be a power transformer for transforming the supplied power from AC to DC. The power converter 105 can be enclosed in the housing or an external power converter can be used. A controller 110 can be a microcontroller that is operationally coupled to different components of the SPA Device 100. A data modem 115 is operationally coupled to the controller. The data modem 115 is having an antenna 120 for connecting to a communication network. A first circuit 130 electrically connects the power converter 105 to the power mains. A second circuit 135 connects the power converter 105 to a relay 125. A third circuit 140 electrically connects the relay 125 to the electronic device 150. The relay 125 is operationally coupled to the controller 110 to regulate the flow of current from the power converter 105 to the electronic device 150. The controller 110 can electronically and programmatically turn the electronic device Off or On by opening and closing the relay 125.

In one embodiment, the modem 115 can connect to an external communication network, referred hereinafter as a network. The modem circuitry can be configured into the controller 110 and can be of a transceiver type that can both send and receive data from a remote server connected to the SPA Device 100 through the communication network. The network may be a text messaging, also known as short message service (SMS) based network. In this case, the controller can send alerts and receive commands via SMS. In other instances, the remote server can be an interactive voice response IVR system based, a data-based, or both. The controller 110 can communicate to the IVR system by a standard telephonic network, such as a public switched telephone network or PSTN). The controller 110 can communicate notifications to the remote server through IVR indicating the status of the power input as detected by SPA Device 100 of the present invention. In one embodiment, the SPA can send alerts by calling a phone number and, upon detecting the call being answered, announce the alert via synthesized speech. The SPA could also be commanded by voice to take action. In one embodiment, the controller 110 and the IVR system of the remote server may be provided with dual tone multifrequency (DTMF) communication capabilities to reduce the amount of data transfer. DTMF may also reduce the setup time to establish communications. A DTMF circuitry can also be configured in the controller 110 which allows the controller to communicate with both IVR and data-based servers. In this instance, the controller 110 may be directed to initially attempt to communicate with one of the IVR system or the data-based system and if the attempt fails, the controller 110 may then attempt to communicate with the other receiving system.

In one embodiment, the communication network may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, 4G, or 5G. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards. The geographical scope of the network may vary widely and the network can be a body area network (BAN), a personal area network (PAN), a local-area network (LAN), e.g. Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol; LPWAN (Low Power Wide Area Network) Protocols including LoRaWAN, Sigfox, NB-IoT (Narrow Band IoT), LTE-M and like; LAN (Local Area Network) Protocols including but not limited to RFID, NFC, BLE, Zigbee, Z wave, Wi-Fi, and like.

The SPA Device 100 through the modem 115 can send notification and receive commands. Commands can be sent to the SPA Device 100 from remote locations to check the status of the power input of the connected electronic device 150. The commands can include power On, power Off, or power cycle the connected electronic device 150. The notification can be sent to a network operations center (NOC) to aid in troubleshooting and remediation of the connected electronic device 150 and further to inform the NOC. The status of the connected electronic device 150 can be determined by the controller 110 based on the amperage of current drawn by the connected electronic device 150. For example, when no current is drawn by the connected electronic device 150, this may indicate that connected the electronic device 150 is not functional. In case, a little current is drawn by the connected electronic device 150, this may indicate that the connected electronic device 150 is in standby mode.

The controller 110 can be configured to detect the presence of alternating current on the first circuit 130. Moreover, the controller 110 can be configured to detect the amperage of the alternating current and any fluctuations including spikes in the alternating current. Perhaps the controller 110 can determine the voltage, amperage, or the frequency of the alternating current. The controller 110 can determine if the voltage, amperage, or the frequency of the alternating current is out of acceptable limits. The circuit interface may include any of a variety of devices that may be utilized to couple to a circuit and to detect the presence or absence of electrical power on the circuit. The first circuit can be coupled with a sensor that can detect the properties of the alternating current on the first circuit. Indeed, the controller 110 can detect the fluctuations in power from a grid. The SPA Device 100 can further comprise a second sensor that can be coupled to the second circuit 135. The second sensor can detect direct current from the power converter 105.

Figure 2:
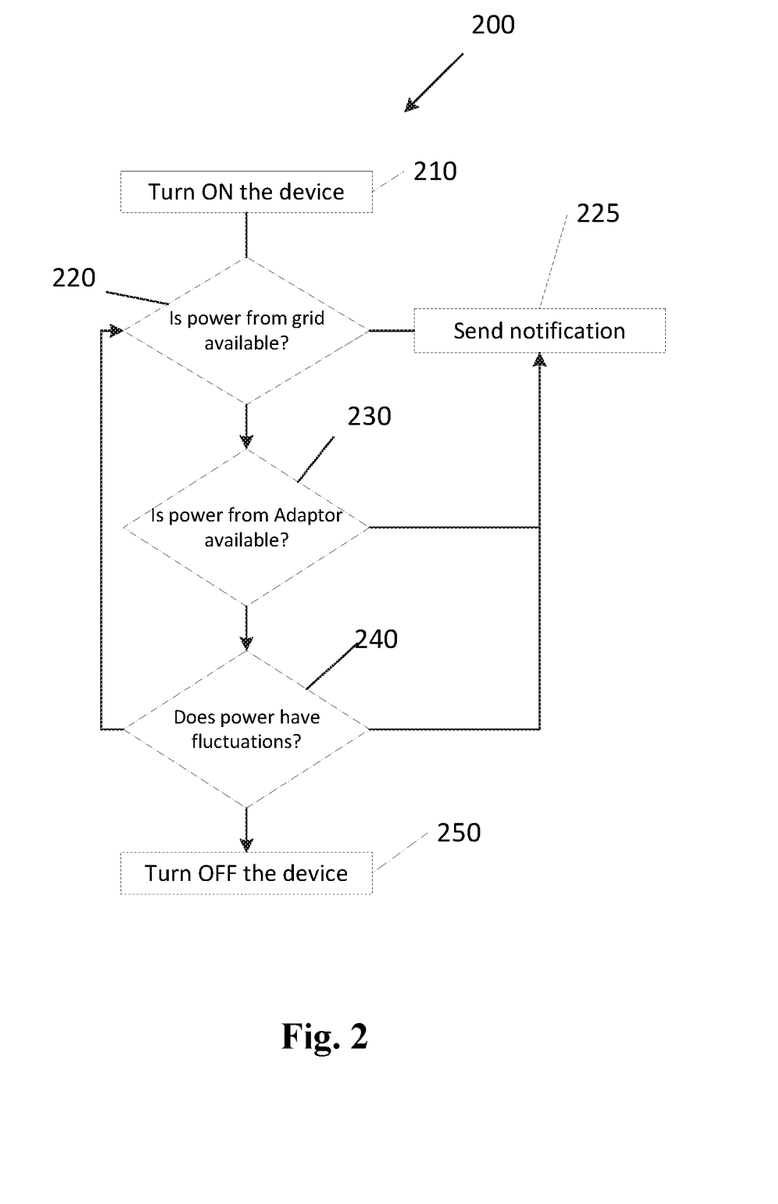
FIG. 2 is a flow chart illustrating an exemplary embodiment of the method according to the present invention.

FIG. 2 is a flow chart showing a method 200 of the present invention. The SPA Device 100 can be turned On at step 210, wherein the SPA Device is connected to the electronic device 150. On turning the device On, the controller 110 through the modem 115 can connect to the communication network. Once, the SPA Device 100 is turned On, the device can detect the alternating current from the mains through the first circuit 130, at step 220. In case, the alternating current can be detected by the controller 110, the controller can then check if the direct current is available from the power converter 105, at step 230. In case, the alternating current cannot be detected, at step 220, on the first circuit 130, the controller 110 can send a notification of power outage, at step 225. The notification can be sent by the controller 110 through the modem 115. In case, the direct current cannot be detected at step 230, a notification of the faulty power converter can be sent at step 225, by the controller 110. Any fluctuations in the supplied power can be determined at step 240 by the controller. In case, the fluctuations are above the acceptable threshold, i.e. the fluctuations can damage the connected electronic device 250, the controller 110 through the relay 125 can cut off the supplied power of the connected electronic device 150, at step 250. Additionally, notification of turning the electronic device Off due to power fluctuations can be sent by the controller 110, at step 225.

Figure 3:
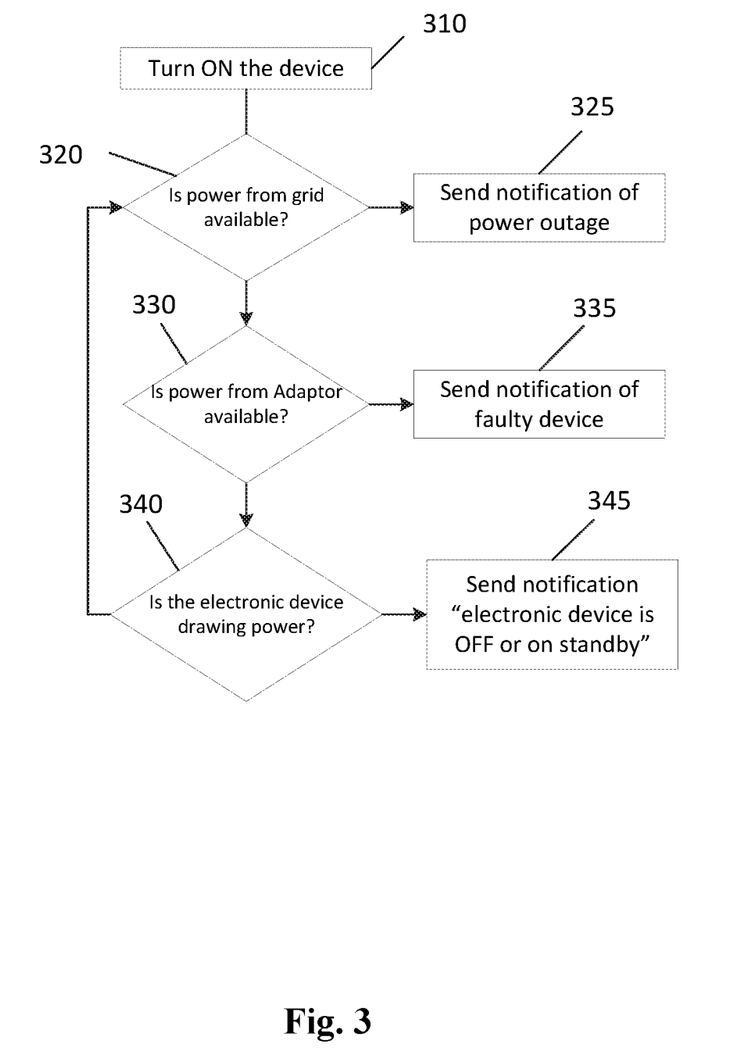
FIG. 3 is a flow chart illustrating another exemplary embodiment of the method according to the present invention.

FIG. 3 shows another exemplary embodiment of the method of the present invention. At step 310, the SPA Device 100 can be turned On. The SPA Device 100 can detect the presence of alternating current from the mains, at step 320. If the alternating current is not available, a notification of power outage from the grid can be sent by the controller 110, at step 325. If the alternating current is available, the direct current can be inspected at step 330 by the controller. In case, the direct current is not detected, a notification of a faulty device can be sent by the controller 110, at step 335. If the direct current can also be detected, at step 330, the drawing of the direct current by the connected electronic device 150 can be tested, at step 340. If the connected electronic device 150 is not drawing the current, a notification that the electronic device 150 is not functional, can be sent by the controller 110, at step 345. Additionally, if the electronic device 150 is withdrawing a lower amount of current, a notification that the electronic device 150 is in standby mode can be sent, at step 345. If the connected electronic device 150 is functioning properly, the device 100 can continue monitoring the power characteristics of the connected electronic device 150.

Figure 4:
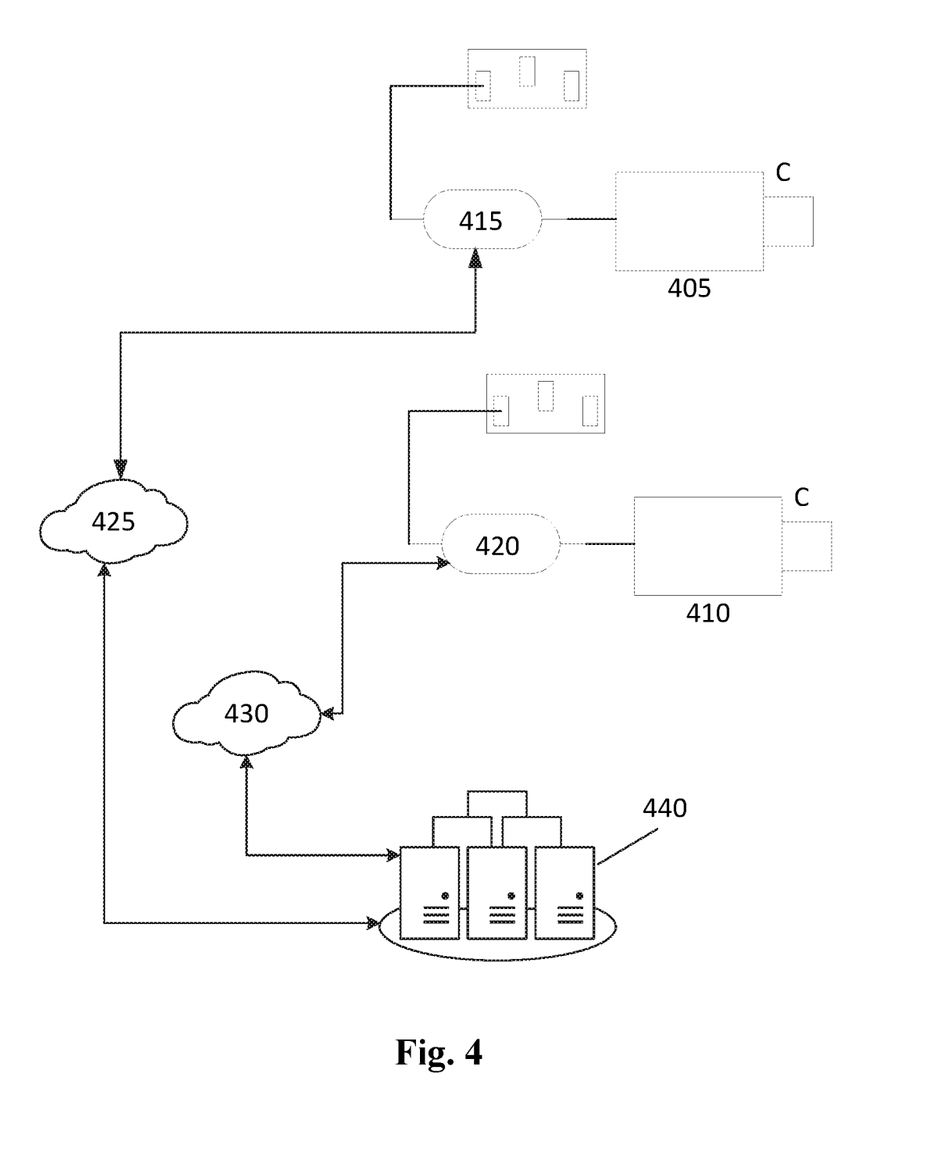
FIG. 4 is a schematic illustrating an exemplary embodiment of the present invention.

FIG. 4 illustrates an exemplary embodiment of the present invention. Two surveillance cameras, a first camera 405 and a second camera 410 are shown. The first camera 405 and the second camera 410 can be in the same locality or a different locality. Both the first camera 405 and the second camera 410 can be a part of a network of surveillance cameras connected to a data center. The first camera 405 can be connected to the first SPA Device 415 of the present invention. The second camera 410 can be electrically connected to a second SPA Device 420 of the present invention. The first SPA Device 415 and the second SPA Device 420 can be connected to the power mains for drawing power. The first SPA Device 415 and the second SPA Device 420 can draw power from the same grid or different grids. The first SPA Device 415 can be connected to a first network 425 through its modem. Similarly, the second SPA Device 420 can be connected to a second network 430 through its modem. In one case, the first network 425 and the second network 430 can be the same. In one case, the first network 425 and the second network 430 can be different. The SPA Device 415 and the SPA Device 420 can be connected to a remote server 440 through the networks 425 and 430 respectfully. The SPA Devices can be connected to the server through two-way communication, wherein the server can receive a notification from the SPA Device and the server itself can also send commands to the devices. The SPA Device monitors the power input of the cameras, and in case any outage of the supplied power is detected by either SPA Device, a notification can be sent by the SPA Device to the server. Also, the server can send an instruction to either SPA Device to turn the cameras On and Off or power cycle the cameras. The device according to the present invention can receive instructions to power On, power Off or power cycle the connected electronic device, or be pre-programmed for any other purposes. Power cycle herein referred to turning the electronic device Off and then On i.e. power rebooting the electronic device.

In one case, the SPA Device according to the present invention can be integrated into the power supply of the electronic device, i.e. the device can be fitted at the time of manufacturing of the power supply of the electronic device. For example, the SPA Device can be a part of the original equipment manufacturers (OEMs) device power supply, so that the end-user does not have to install the device separately.

In one embodiment, the present invention can be used to monitor grid-wide power outages. Several SPA Devices being installed in several locations can report the outages of the supplied power. The notifications of power outage from different locations in which the SPA Devices are installed can be used to map a bigger area that may be affected by the power outage. Such information can be used to inquire about reasons for power outage and duration the power outage may last.

Although FIG. 4 has been illustrated using an example of cameras, the electronic device can be any electronic device in a network or an independent electronic device. In one embodiment, the electronic device can be telecommunication equipment including Routers, Switches, Access Points, Hubs, Concentrators, and Telephones. In one embodiment, the electronic device can be an electronic surveillance and security equipment including Cameras, Gateways, Hubs, Panels, etc. In one embodiment, the electronic device can be Computers or controllers. In one embodiment, the electronic device can be set-top boxes, DVRs, household appliances.

The SPA Device 100, in certain embodiments, may include a battery backup and function even if power has been lost from the service provider. During normal operation when the supplied power is available from the service provider or a power source, the SPA Device may receive power primarily from the power converter 105. In the event of a power outage, the SPA Device may switch to receive power from the battery to continue operation. The battery can be a rechargeable lithium-ion battery. In one case, the battery can be integrated into the housing of the SPA Device 100. In one case, the battery can be external. The battery can use chemical, capacitor or other storage methods.

Also, it is to be understood that the invention has been described as having a power converter for AC to DC conversion. A skilled person will appreciate the present invention can work with an external power converter or adaptor. The SPA device can determine the amperage of the direct current from the external adaptor to determine the power outage and alert the remote server accordingly.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A device comprising:
   a housing;
   a controller enclosed in the housing and configured to send one or more notifications and receive one or more commands from a remote server through a network;
   a relay operably coupled to the controller;
   a first circuit electrically connecting a power converter to power mains;
   a second circuit electrically connecting the power converter to the relay; and
   a third circuit electrically connecting the relay to a connected electronic device, the relay configured to electrically connect the second circuit to the third circuit for powering the connected electronic device, wherein the controller is configured to determine alternating current status on the first circuit and a direct current status on the second circuit or the third circuit, wherein the one or more notifications are based on the alternating current status or the direct current status.

2. The device of claim 1, wherein the relay is configured to switch between a first position and a second position by the controller, in the first position current can flow from the second circuit to the third circuit, in the second position current does not flow from the second circuit to the third circuit.

3. The device of claim 1, wherein the alternating current status comprises amperage and fluctuations.

4. The device of claim 1, wherein the direct current status comprises amperage of current drawn by the connected electronic device.

5. The device of claim 1, wherein the remote server is a network operation center, and the network is a wireless network.

6. The device of claim 1, wherein the connected electronic device is a surveillance camera, ethernet switch, router, access point, concentrator, computer, sensor, hub, control panel, or a telephone.

7. The device of claim 1, wherein the controller is configured with a modem circuitry for connecting to the network, the network comprises a cellular network, and the one or more notifications are sent by short message service (SMS) and the one or more commands are received by short message service (SMS).

8. The device of claim 1, wherein the controller is configured with a modem circuitry for connecting to the network, the modem circuitry configured for both sending and receiving data, the network comprises cellular network for connecting to an interactive voice response (IVR) system.

9. The device of claim 8, wherein the controller is further configured with a Dual Tone Multiple Frequency (DTMF) circuitry.

10. The device of claim 1, wherein the device comprises a first sensor coupled to the first circuit, the first sensor configured to determine the alternating current status, the first sensor operably coupled to the controller.

11. The device of claim 10, wherein the device comprises a second sensor coupled to the second circuit or the third circuit, the second sensor configured to determine the direct current status, the second sensor operably coupled to the controller.

12. The device of claim 1, wherein the device is integrated into the connected electronic device.

13. The device of claim 1, wherein the device further comprises a battery, and the controller is configured to switch to and from the battery.

14. The device of claim 1, wherein the power converter is enclosed in the housing.

15. The device of claim 1, wherein the control unit is further configured to:
determine a power outage; and
send a notification of the power outage to the remote server.

16. A method of monitoring power input of a connected electronic device, the method comprising:
providing a device, the device comprises:
a housing,
a controller enclosed in the housing and configured to send one or more notifications and receive one or more commands from a remote server through a network,
a relay operably coupled to the controller,
a first circuit electrically connecting a power converter to power mains;
a second circuit electrically connecting the power converter to the relay, and
a third circuit electrically connecting the relay to the connected electronic device, the relay configured to electrically connect the second circuit to the third circuit for powering the connected electronic device,
wherein the controller is configured to determine alternating current status on the first circuit and a direct current status on the second circuit or the third circuit
transmitting, by the device, the one or more notifications to the remote server, the one or more notifications are based on the alternating current status or the direct current status.

17. The method of claim 16, wherein the method further comprises:
determining, by the controller, a power outage; and
sending, by the controller, a notification of power outage to the remote server.

18. The method of claim 16, wherein the method comprises:
determining, by the controller, amperage of current drawn by the connected electronic device;
determining, by the controller, status of the connected electronic device based on the amperage; and
sending, by the controller, a notification of the status to the remote server.

19. The method of claim 16, wherein the method further comprises:
receiving, by the controller, from the remote server, a command for rebooting;
closing, by the controller, the relay; and
opening, by the controller, the relay after a predetermined period duration.

20. A device comprising:
a housing;
a controller enclosed in the housing and configured to send one or more notifications and receive one or more commands from a remote server through a network;
a relay operably coupled to the controller, the relay configured to switch between an open position and a closed position;
a second circuit electrically connecting a power source to the relay; and
a third circuit electrically connecting the relay to a connected electronic device, the relay configured to electrically connect the second circuit to the third circuit for powering the connected electronic device,
wherein the controller is configured to determine a direct current status on the second circuit or the third circuit, the direct current status comprising amperage on the second circuit or the third circuit, and the amperage of direct current drawn by the connected electronic device
wherein the one or more notifications are based on the direct current status.

* * * * *